June 5, 1962 R. H. SCHLIDT ET AL 3,037,783
HANDLE FOR RAPID INTERCHANGEABILITY OF VARIOUS TOOLS
Filed Jan. 2, 1959 2 Sheets-Sheet 1
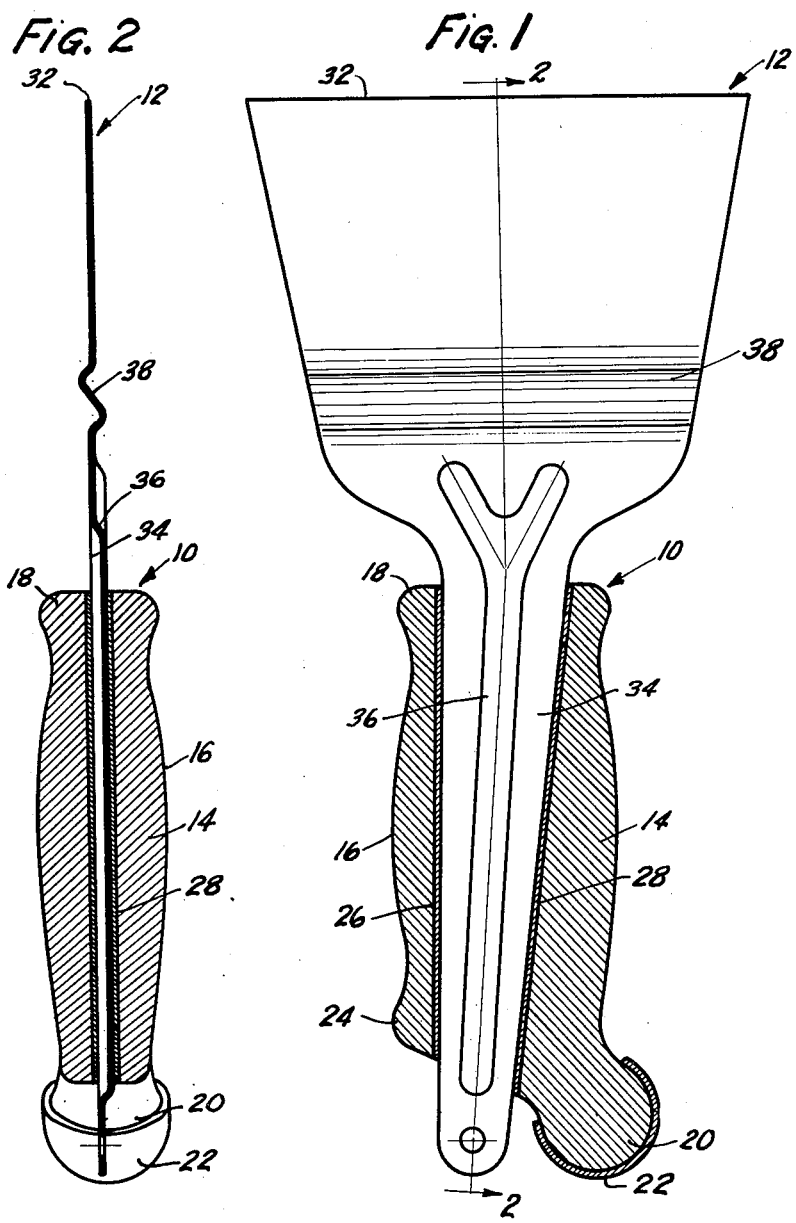
DE-PS-10001
20.Dez.58

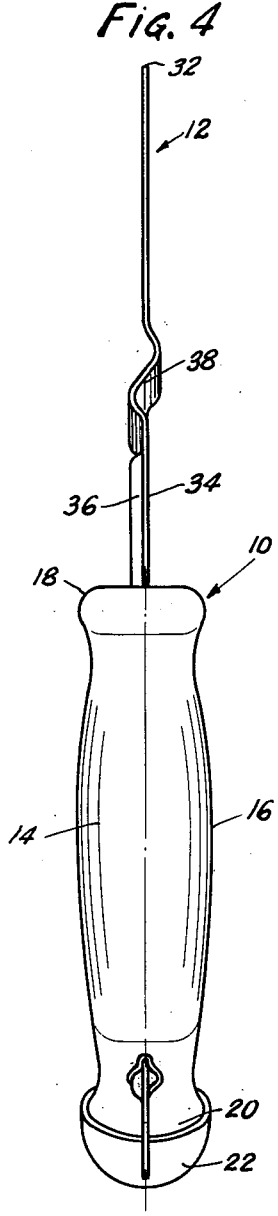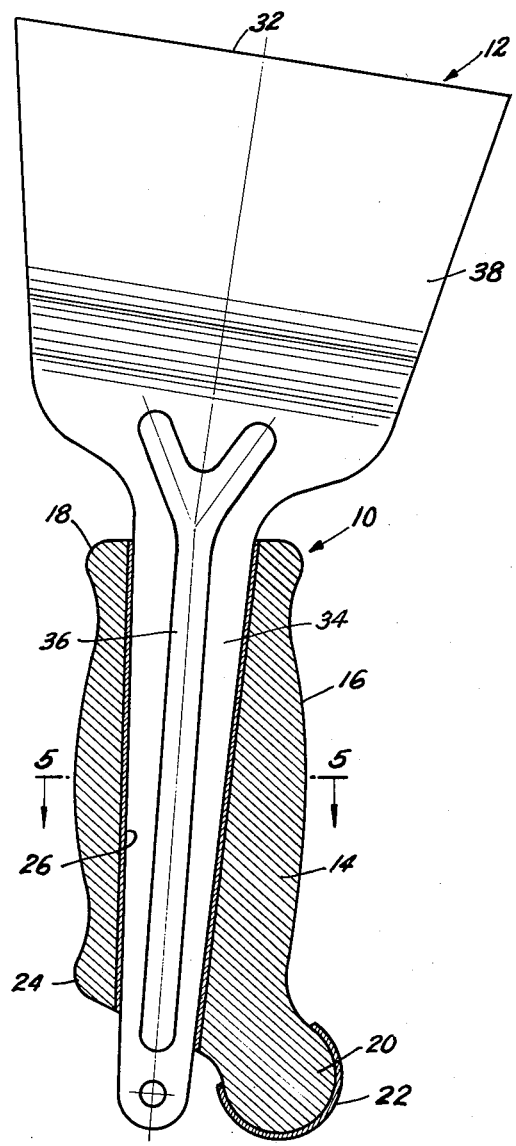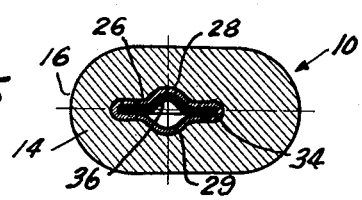

United States Patent Office 3,037,783
Patented June 5, 1962

3,037,783
HANDLE FOR RAPID INTERCHANGEABILITY OF VARIOUS TOOLS
Rudolf H. Schlidt, 3306 Panorama Drive SE., and Fritz K. Pauli, 2011 Bide-A-Wee Drive, both of Huntsville, Ala.
Filed Jan. 2, 1959, Ser. No. 784,576
7 Claims. (Cl. 279—102)

This invention relates to hand tools and more particularly to an improved handle construction for such tools which is capable of being easily engaged and disengaged from such tools.

An object of the present invention is the provision of a handle construction for receiving a handle engaging element or part of a hand tool in such a way that the handle can be easily and simply attached and removed from the tool.

Another object of the present invention is the provision of a manual tool handle having means therein for receiving a handle engaging part of a manual tool and wedging the same therein through an impact action on the handle and releasing the same by engagement with the handle engaging part.

These and other objects of the present invention will become more apparent during the course of the following detailed description and appended claims.

The invention may best be understood with reference to the accompanying drawings wherein an illustrative embodiment is shown.

In the drawings:

FIGURE 1 is an elevational view of a manual tool with a handle embodying the principles of the present invention attached thereto, the handle being shown in vertical section;

FIGURE 2 is a sectional view taken along the line 2—2 of FIGURE 1;

FIGURE 3 is a view similar to FIGURE 1 showing the handle on the tool in reversed position;

FIGURE 4 is a side elevational view of the structure shown in FIGURE 3; and

FIGURE 5 is a sectional view taken along the line 5—5 of FIGURE 3.

Referring now more particularly to the drawings, there is shown therein a handle construction, generally indicated at 10, which is arranged to receive a manual tool, generally indicated at 12. As shown, the tool 12 is a scraper, such as might be utilized as a putty knife or the like, but it will be understood that the principles of the present invention are readily adaptable to any type of manual tool, as for example, masonry tools, carpentry tools, paint tools, plasterer tools, dry wall finishing tools, garden tools and the like.

The handle 10 comprises an elongated body 14 having its outer periphery contoured to fit conveniently into the hand of a user. As best shown in FIGURE 5, the profile of the body of the handle 14 is of generally oval shape and the central portion thereof is slightly convex, as indicated at 16. At one end of the handle a rounded peripheral flange 18 is provided which serves as a stop to prevent the hand from moving off of the central portion 16 in the direction of the flange 18. At the opposite end of the handle there is provided an enlarged depending projection or knob 20 having a metallic cap 22 secured thereon. The knob 20 extends laterally from one side of the center line of the body 14 and on the opposite side thereof there is provided a small projecting flange portion 24 which serves a purpose similar to the flange 18.

The body 14 of the handle 10 may be made of any suitable material such as plastic, and the handle 10 shown in the drawing is preferably of a plastic material.

Extending completely through the body of the handle is a tapered opening 26, the walls of such opening converging toward the end of the handle upon which the knob 20 is provided. Preferably the opening 26 is lined with a sleeve 28, the provision of such sleeve being particularly desirable where the handle is made of a plastic material. Preferably the sleeve has a cross-section which is of elongated oval configuration having central bulges or rib-receiving concavo-convex central portions 29.

The tool 12 comprises a blade portion 30 having a straight edge 32 formed on one end thereof and a handle engaging part or element 34 extending outwardly from the opposite end thereof. The handle engaging element 34 is of wedge-shaped construction and the side edges thereof converge in a direction outwardly of the blade 30. As shown in FIGURES 1 and 3, the length of the handle engaging portion is greater than the length of the opening 26 in the handle 10 so that the outer extremity of the handle engaging part or element extends outwardly beyond the opening when the handle engaging part is mounted thereon. Formed in the central portion of the blade engaging part 34 is a rib 36 of concavo-convex configuration which serves to reinforce the handle engaging part. As shown, the blade 30 may be provided with desirable resilience by forming a corrugation 38 therein adjacent the handle-engaging part 34, such corrugation extending parallel to the straight edge 32. It will be noted that the axis of the handle-engaging portion is inclined with respect to a line perpendicular to the straight edge 32.

In operation, the tool 12 is mounted in the handle 10 by inserting the handle-engaging part 34 within the sleeve 28 and in this regard, it will be noted that the rib 36 will fit within one of the rib receiving portions or bulges 29 formed in the sleeve 28. With the part 34 initially inserted in the sleeve 28, the handle is gripped and the knob 20 thereof is impacted on a suitable rigid surface. This impact action has the effect of moving the part 34 into tight wedging engagement within the sleeve. In this way, the tool can be easily attached to the handle so that the tool is provided with a convenient handle which is comfortable to the grip. Moreover, the wedging engagement is such that the tool is firmly gripped and effectively locked to the handle. When it is desired to remove the handle, as for example, to reverse the blade therein from the position shown in FIGURE 1 to the position shown in FIGURE 3, the handle 10 is gripped by the user and then the projecting end of the part 34 is engaged on a suitable rigid surface, thus applying an upward force to the part 34, the wedging action is released and the part 34 will be moved out of the sleeve 28.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claims:

1. In combination, a tool having an elongated outwardly converging wedge shaped handle engaging part, and an elongated handle having an opening extending longitudinally therethrough of a wedge shaped configuration to receive said part in wedging engagement therewith with the extremity of said part extending outwardly from said opening, said handle having an impact blow receiving portion formed thereon in laterally extending relation to said opening and facing in the direction of the end of said opening through which the extremity of said part extends when in wedging engagement therewith whereby said part can be driven into tight wedging engagement within said opening by grasping the handle and impacting the blow receiving portion thereof on a rigid surface and said tight wedging engagement can be released by grasping the handle and engaging the outwardly extending extremity of said part on a rigid surface.

2. The combination as defined in claim 1 wherein said part is formed with a longitudinally extending rib thereon and said opening is provided with opposed rib receiving grooves whereby said part can be inserted selectively within said opening in either one of two reversed positions wherein said rib engages within one or the other of said grooves.

3. A handle comprising an elongated body having an exterior contour of a shape to be manually gripped, said body having an opening extending longitudinally therethrough, said opening converging in a direction toward one end thereof, said body having a fixed impact blow receiving portion extending laterally with respect to said opening, said portion including exterior surface means facing in the direction of said one end thereof.

4. A handle as defined in claim 3 wherein said opening in cross-section is of elongated oval configuration having opposed depressions extending transversely with respect to the longitudinal extent of said oval configuration.

5. A handle as defined in claim 3 wherein said impact blow receiving portion comprises a rounded knob projecting from the end of said body adjacent said opening end and terminating in laterally spaced relation therefrom.

6. A handle as defined in claim 5 wherein said body is made of plastic and wherein a metal sleeve reinforcing said opening is mounted within said plastic body.

7. A handle as defined in claim 6 wherein said knob includes a metal cap covering the same.

References Cited in the file of this patent

UNITED STATES PATENTS

| | | |
|---|---|---|
| 418,090 | Thompson | Dec. 24, 1889 |
| 1,717,562 | Howard | June 18, 1929 |
| 2,229,202 | Winslow | Jan. 21, 1941 |
| 2,669,181 | Cooper et al. | Feb. 16, 1954 |
| 2,679,064 | Palma et al. | May 25, 1954 |
| 2,810,150 | Ellman | Oct. 22, 1957 |